3,054,818
SILICON-NITROGEN COMPOUNDS AND PROCESS FOR THE PREPARATION THEREOF

Enrico J. Pepe, Kenmore, and Bernard Kanner, Tonawanda, N.Y., assignors to Union Carbide Corporation, a corporation of New York
No Drawing. Filed Dec. 30, 1959, Ser. No. 862,756
7 Claims. (Cl. 260—448.8)

This invention relates in general to silicon-nitrogen compounds and to a process for preparing the same. More particularly, this invention relates to the silicon-nitrogen compounds having an aryl hydrocarbon group bonded to a nitrogen, the nitrogen also being bonded to a silicon atom and to a process for their preparation.

Heretofore, in order to prepare compounds having a silicon-nitrogen bond it was necessary to react appropriate nitrogen containing compounds such as ammonia, methylamine, dimethylamine and the like, with halosilanes, silicon tetrachloride, methyl trichlorosilane, trimethylchlorosilane and the like. The halosilanes are difficult to purify and present serious corrosion problems on storage. In addition, in order to obtain satisfactory yields of the silicon-nitrogen compounds, it is necessary to employ an excess of the nitrogen containing compound in order to remove the hydrogen chloride by-product, produced in the reaction.

It is an object of this invention to produce novel silicon-nitrogen compounds wherein the silicon atom is bonded to a nitrogen atom having an aryl group attached thereto.

It is a further object of this invention to provide a process for producing silicon-nitrogen compounds wherein there is no hydrohalic acid produced, thereby reducing the amount of the nitrogen containing compound necessary for complete reaction.

Other objects and advantages of this invention will become apparent as the following description of the invention proceeds.

The instant invention is related to a process for the production of monomeric and polymeric silicon-nitrogen compounds and to novel monomeric and polymeric silicon-nitrogen compounds produced thereby.

The monomeric silicon-nitrogen compounds produced according to the process of this invention are the silicon-nitrogen compounds of the formula (1)
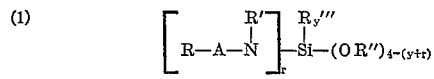

where A is a divalent aromatic hydrocarbon radical, R is hydrogen fluorine or a monovalent organic radical free of reactive halogen or reactive hydrogen, R" is a monovalent hydrocarbon radical, R''' is a monovalent hydrocarbon radical, (y) is an integer having a value of from 0 to 3, r is 1 or 2, and R' is hydrogen, an alkyl, aryl, aralkyl, cycloalkyl or an

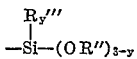

group, wherein R''', R" and y are as above-defined.

The polymeric silicon-nitrogen compounds produced according to the process of this invention are the polymeric silicon-nitrogen compounds of the formula (2)
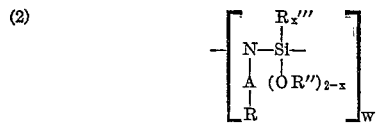

wherein A, R, R" and R''' are as above defined, x is an integer of from 0 to 2 and w is an integer of at least 3.

The silicon-nitrogen compounds of Formula 2 can exist as cyclic compound containing from 3 to 7 such units or they can exist as linear compounds containing a number of such units.

Illustrative of the divalent aromatic hydrocarbon radicals that A can represent are phenylene, tolylene, naphthylene, biphenylene, and the like. Illustrative of the monovalent organic radicals free of reactive halogen or reactive hydrogen that R may represent are alkyl groups such as methyl, ethyl, propyl, octadecyl and the like; aryl groups such as phenyl, tolyl, xylyl and the like; cycloalkyl groups such as cyclopentyl, cyclohexyl, bicycloheptyl and the like; aralkyl such as phenylethyl, phenylpropyl and the like; alkoxy groups such as methoxy, ethoxy, propoxy, 2-ethylhexoxy and the like; aryloxy groups such as phenoxy, naphthyloxy and the like; substituted amine radicals of the formula (—NR$^1_2$) wherein R$^1$ represents the alkyl, aryl, cycloalkyl, aralkyl groups given for R and the like; and fluorine substituted alkyl, aryl, aralkyl and cycloalkyl groups. By the term "reactive hydrogen" as employed herein is meant compounds containing any of the following units: —SH, OH, or NH$_2$ as substituents on the monovalent organic radical. By the term "reactive halogen" as employed herein is meant chlorine, bromine or iodine. Other groups which it is not desirable for the monovalent organic radicals to contain are for example, carbonyl groups, cyano groups (—CN), nitro groups (NO$_2$), or sulfonyl groups and the like.

Illustrative of the alkyl, aryl, aralkyl and cycloalkyl that R' can represent are the alkyl, aryl, aralkyl and cycloalkyl groups as given for R. Illustrative of the

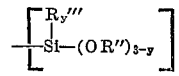

groups that R' can represent are the trialkoxysilyl, alkoxyalkylsilyl and arylalkoxysilyl groups such as triethoxysilyl, tributoxysilyl, diethoxymethylsilyl, ethoxydipropylsilyl, phenyldiethoxysilyl, ditolylethoxysilyl and the like, trimethylsilyl, triethylsilyl and the like. Illustrative of the monovalent hydrocarbon radicals that R" and R''' may represent are the alkyl, aryl, cycloalkyl, aralkyl groups defined for R and in addition alkenyl groups such as vinyl, allyl and the like.

According to the process of the instant invention silicon-nitrogen monomers of Formula 1 are produced by the reaction of a halogen-substituted arylamine of the formula (3)

$$\text{X—A—N—H} \atop \phantom{X—A—}\overset{R}{|}\phantom{—}\overset{R'}{|}$$

wherein A, R and R' are as above defined and X is halogen selected from the class consisting of chlorine, bromine and iodine with magnesium and a silicon-ester of the formulas (4) 

and (5) 

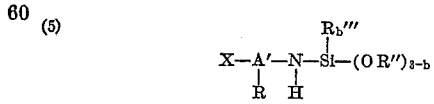

wherein R, R", R''', X and (y) are as previously defined and A' is an aromatic hydrocarbon radical and (b) is an integer from 0 to 2. Although not intending to be bound by any particular theory it is thought that the reaction takes place according to the following equations which for the purpose of illustration shows the reaction of chloroaniline with magnesium and where ethylsilicate is employed as the silicon-ester:

(A)  Cl—C₆H₄NH₂ + Mg → ClMgC₆H₄NH₂

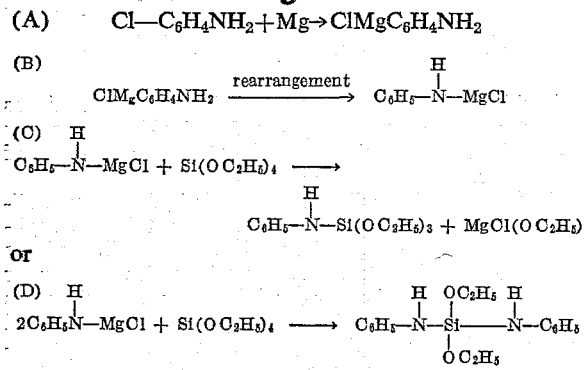

or

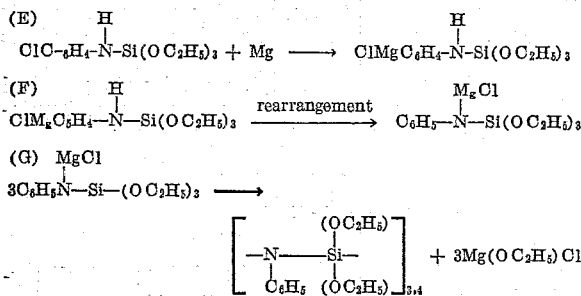

It can be seen that the silicon-esters as defined by Formula 5 can also be classified as halogen substituted amines of Formula 3 i.e. a halogen substituted arylamine of Formula 3 wherein R' is a

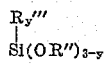

group, R''' is as above defined and y is limited to the values 0, 1 or 2. When these silicon-ester-halogen substituted arylamines are employed in the process of this invention, the polymeric silicon-nitrogen compounds of Formula 2 are produced, as illustrated by the following equations:

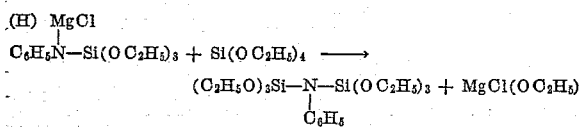

If the silicon-ester-halogen substituted amines are reacted with magnesium, as in Equations E and F and in the presence of ethylorthosilicate the following reaction also occurs to produce the indicated product:

(H)  

Illustrative of the halogen-substituted arylamines of Formula 3 that can be employed in the process of this invention are 2-chloroaniline, 4-chloro-N-(methyl)aniline, 3-chloro - N - (triethoxysilyl)aniline, 2-chloronaphthylamine, 1-bromo-2-naphthylamine, 2-methyl - 3 - chloroaniline, 3-methyl-4-chloroaniline, 4-bromoaniline, 2-(4-iodophenyl)napthylamine, 4 - chloro - N-(trimethylsilyl) aniline, 2-chloro-N-(methyldiethoxysilyl)aniline, and the like.

It is preferred to employ as the halogen substituted arylamine, in the process of this invention, chlorophenyl amines of the formula (6)    R'
       |
   Cl—C₆H₄—N—H wherein R' is as previously defined, since such chlorophenylamines are inexpensive.

Illustrative of the silicon-esters of Formula 4 that can be employed in the process of this invention are orthosilicate, methyltriethoxysilane, methyldiethoxysilane, trimethylethoxysilane, phenyltriethoxysilane, phenyl (methyl)dimethoxysilane and the like.

Illustrative of the silicon-esters of Formula 5 or the halogen-substituted arylamines of Formula 3 that can be employed in the process of this invention are: 3-chloro-N-(triethoxysilyl)aniline, 4 - bromo-N-(methyldiethoxysilyl)anilines, 4 - bromo-N-(dimethylethoxysilyl) aniline, 4-chloro-N-(trimethylsilyl)aniline and the like.

The general procedure to be followed in carrying out the process of the invention is as follows:

The halogen-substituted arylamine and siliconester in suitable amounts as hereinafter described are charged into the reaction vessel together with an amount of magnesium sufficient to initiate the reaction. The mixture is then heated to a temperature sufficiently elevated so as to initiate the reaction. The heating is continued and the magnesium added at a rate sufficient to maintain the reaction without vigorous boiling (i.e. boiling at a rate sufficient to flood the condensing head), until a stoichiometric amount of magnesium has been added.

The temperature at which the process of this invention is conducted is not narrowly critical and can vary from about 125° C. to about 300° C. For example, in the reaction employing orthosilicate as the silicon-ester it is preferred to conduct the reaction at the reflux temperature of the orthosilicate.

The pressure at which the process of this invention is carried out is not narrowly critical. The process can be conducted at pressure greater than or less than atmospheric or it can be conducted at atmospheric pressure. It is preferred to carry out the process at atmospheric pressure for economy and simplicity of operation. Where lower boiling siliconesters (i.e. those boiling below about 100° C.) are employed, such as trimethylethoxysilane, it may be necessary to run the reaction in a pressure vessel in order to obtain a sufficiently high reaction temperature.

Although a solvent for the halogen-substituted arylamine and silicon-ester is not necessary in conducting the process of this invention employing a primary halogen-substituted arylamine, a solvent may be employed if desired. However, no commensurate advantage is obtained thereby. It is preferred to employ as the solvent an excess (i.e. an excess over that required by the stoichiometry of the reaction) of either the silicon-ester or the halogen-substituted arylamine. Secondary halogen-substituted arylamines react more sluggishly and limited amounts of an organic solvent such as tetrahydrofuran are advantageously employed. The amount of such organic solvent employed is not narrowly critical and can range from 5 parts by weight to 250 parts by weight of the organic solvent per 100 parts by weight of the silicon-ester. It is preferred to employ 5 to 50 parts by weight of the organic solvent per 100 parts by weight of the silicon-ester.

Although a reaction initiator is not necessary in conducting the process of this invention, a reaction initiator may be employed if desired. By the term "reaction initiator" as employed herein is meant those substances normally employed in the art to initiate the formation of Grignard reagents. Such initiators are, for example, iodine, bromine and the like; and alkyl Grignard reagents and the like.

The amount of the various reactants employed is dependent upon the number of ester groups of the silicon-ester that are to be replaced. Thus, for example, if it is desired to replace one ester group of the silicon-ester with an arylamino group

it is desirable to employ equal molar ratios of the various reactants, i.e., silicon-ester, magnesium and the halogen-substituted arylamine. Where more than one ester group of the silicon-ester is to be replaced, it is desirable to employ one mole of magnesium and one mole of the halogen-substituted arylamine for each ester group to be replaced.

The magnesium used in the process of this invention is preferably in a form so as to provide a maximum amount of surface area available for reaction. Thus, it is preferred to employ the magnesium in the form of powder or turnings. Other forms of magnesium such as granules or the like, can be employed but no commensurate advantages are obtained thereby.

The silicon-nitrogen compounds of Formula 1 produced by the process of this invention are monomeric silicon-nitrogen compounds. Illustrative of these monomeric silicon-nitrogen compounds are for example: N-(triethoxysilyl)aniline, N-(trimethylsilyl)aniline, N-(methyldibutoxysilyl)aniline, N,N-bis-(triethoxysilyl)aniline, N-(trimethylsilyl)-N-(triethoxysilyl)aniline, and the like.

The silicon-nitrogen compounds of Formula 2 produced by the process of this invention are polymeric silicon-nitrogen compounds. These polymeric silicon-nitrogen compounds can exist as cyclic materials having from 3 to 7 such units or they can exist as linear polymer having a plurality of such units. Illustrative of these polymeric silicon-nitrogen compounds are:

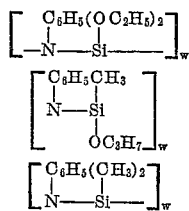

and the like where ($w$) is an integer of at least 3.

The novel silicon-nitrogen compounds of this invention are the organosilyl amines of the formula (7)

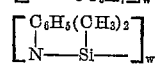

wherein R, R" and A are as above defined. $R^2$ is hydrogen an alkyl, aryl or cycloalkyl group as defined for R', or an

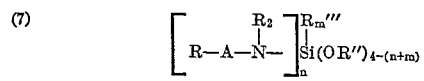

group where R" and R''' are as above defined, $n$ is an integer of from 1 to 2 and $m$ is an integer of from 0 to 2 and the sum of ($n+m$) is not greater than 3. Illustrative of these novel silicon-nitrogen compounds are, for example, N(trimethoxysilyl)aniline, N(triethoxysilyl)N-methyl aniline, N-(tributoxysilyl)N-phenyl aniline and the like; compounds of the formulas:

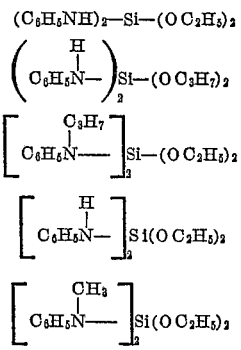

and the like; N,N-di(triethoxysilyl) phenyl amine $$C_6H_5N-[Si(OC_2H_5)_3]_2$$

N,N-di-(diethoxyphenylsilyl)tolylamine, $$CH_3C_6H_4N-[Si(C_6H_5)(OC_2H_5)_2]_2$$

N,N-di(methyldiphenoxysilyl)biphenylamine, $$C_6H_5-C_6H_4-N-[Si(CH_3)(OC_6H_5)_2]_2$$

and the like.

Also included in the novel silicon-nitrogen compounds of this invention are the silicon-nitrogen compounds containing units of the formula:

(8)

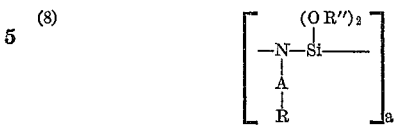

wherein R, R" and A are as above defined, and ($a$) is an integer having a value of at least 3. The silicon-nitrogen compound containing the units represented by the unit Formula 8 can exist as cyclic silicon-nitrogen compounds containing from 3 to 7 such units or they can exist as linear silicon-nitrogen compounds containing a number of such units and can also be called N-aryl diethoxysilazanes or arylsilyl amines. Illustrative of the cyclic silazanes or silyl amines are for example: N,N,N,1,3,5-triphenyl-2,2,4,4,6,6-hexaethoxycyclotrisilazane, N,N,N,N,1,3,5,7 - tetraphenyl - 2,2,4,4,6,6,8,8 - octamethoxycyclotetrasilazane and the like; the linear silazanes are for example, N-phenyldiethoxypolysilazane

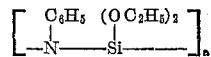

N-phenyldimethoxypolysilazane

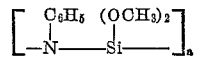

and the like, where $a$ is as above defined.

The compositions of this invention are useful as antioxidants in silicone resin and elastomer compositions. The compositions of this invention are also useful as intermediates in the preparation of polymers which are useful as protective and decorative coatings.

The following examples are given to further illustrate the invention and are not to be construed as limitations thereon.

EXAMPLE I

*Reaction of Ortho-chloroaniline With Magnesium and Ethyl Orthosilicate*

Into a 1-liter 3-necked flask fitted with a mechanical stirrer, reflux condenser and a thermometer were charged ortho-chloroaniline (64 g. 0.5 mol.), ethyl orthosilicate (104 g., 0.5 mol.) and powdered magnesium (1 g.). The contents of the flask were heated to 168° C. at which temperature the reaction was initiated as indicated by vigorous bubbling at the surface of the magnesium. An additional amount of powdered magnesium (11 g. total Mg., 12 g., 0.5 mol.) was added in small increments over a 1 to 1½ hour period. The mixture was cooled to room temperature, and filtered to remove the salts formed in the reaction. The filtrate was distilled under reduced pressure to yield fraction 1 (B. P. 84° C. at 0.38 mm. Hg, $n_D{}^{25}$, 1.4797) and fraction 2 (B. P. 140° C. at 0.3 mm. Hg).

Fraction 1 was identified as N-(triethoxysily)-aniline

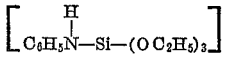

and gave the following elemental analysis.

Calc. for $C_{12}H_{21}SiO_3N$: 10.9% Si; 56.2% C; 8.3% H; 5.5% N. Found: 10.7% Si; 56.4% C; 8.4% H; 5.2% N.

Fraction 2 was identified as $(C_6H_5NH-)_2Si(OC_2H_5)_2$ which gave the following analysis.

Calc. for $C_{16}H_{22}SiO_2N_2$: 9.3% Si; 63.5% C; 7.3% H; 9.3% N. Found: 9.1% Si; 62.1% C; 7.2% H; 8.6% N.

EXAMPLE II

*Reaction of Meta-chloroaniline With Magnesium and Ethyl Orthosilicate*

Into a 1-liter, 3-necked flask fitted with a stirrer, condenser, thermometer and an electric heating mantle were placed metachloroaniline (128 g., 1.0 mol), ethyl orthosilicate (312 g., 1.5 mol.) and magnesium powder (5 g.). The mixture was heated with stirring to 168° C. (reflux).

The reaction initiated rapidly and over a period of 1.5 hours an additional 19.3 g. (total=24.3 g. or 1.0 mole) of magnesium powder was added to the reaction mixture. The reaction was moderated by occasionally applying an ice bath to the reaction flask. After the addition of the magnesium was complete, the reaction mixture was refluxed for 1.0 hours. A reflux temperature of 190° C. was attained at the end of the reaction. After cooling to room temperature, benzene (200 ml.) was added. The reaction mixture was filtered and the solids washed with additional benzene. A total of 102 g. of magnesium salts were collected (theory=104.8 g.). Upon distillation of the filtrate the following fractions were collected:

| Fraction | Boiling Point, ° C. | Pressure, mm. | Weight Collected, g. | Neutralization Equivalent |
|---|---|---|---|---|
| A | to 84 | 0.2–0.35 | | |
| B | 84–86 | 0.3 | 116 | 262 |
| C | 87–145 | 0.3 | 52.7 | 219 |
| D | 146–200 | 0.3 | 20.0 | 179 |
| E | residue | | 3.0 | |

Fraction B was identified by infra-red spectral analysis as being N-(triethoxysilyl)phenyl amine.

Fraction D was identified by infra-red spectral analysis as being mainly di-(N-phenylamino) diethoxysilane $$(C_6H_5\overset{H}{N})_2Si(OC_2H_5)_2$$

Neutralization equivalent is the number of grams of the compound per amino-nitrogen as determined by the direct titration of the Si—N bond with perchloric acid in an acetic acid media employing methyl violet as the indicator (blue→green).

EXAMPLE III

*Reaction of Para-chloroaniline With Magnesium and Ethyl Orthosilicate*

Into a 1-liter, 3-necked flask fitted with a stirrer, condenser, thermometer and heating mantle were placed (1.0 mole) of para-chloroaniline (128 g. 1.0 mol.) 312 g. (1.5 mole) of ethyl orthosilicate (213 g. and 1.5 mol) of magnesium powder (5 g.). The mixture was heated with stirring to reflux (168° C.) The reaction initiated rapidly and over a period of 1.5 hours an additional 19.3 g. (total 24.3 g. or 1.0 mole) of magnesium powder was added to the reaction mixture. The reaction was moderated occasionally by applying an ice bath to the reaction flask. After addition was complete, the reaction mixture was refluxed for 1.0 hour. A reflux temperature of 190° C. was reached by the end of the reflux period. After cooling at room temperature, 200 ml. of benzene was added. The reaction mixture was filtered and the solids washed with additional benzene. The benzene washings were combined with the filtrate and the filtrate solvents removed by vacuum evaporation leaving a residue. A total of 103 g. of magnesium salts was collected (theory 104.8 g.). Upon distillation of the above residue, the following fractions were collected.

| Fraction | Boiling Point, ° C. | Pressure, mm. | Weight Collected, g. | Neutralization Equivalent |
|---|---|---|---|---|
| A | to 88 | 0.3 | 8 | 267 |
| B | 88 | 0.3 | 106.7 | 273 |
| C | 89 to 195 | 0.3 | 80 | 193 |
| D | residue | | 3 | |

Upon redistillation of fraction B, a product was obtained having the properties: (B. P. 88° C. at 0.3 mm. Hg, $n_D^{25}=1.4741$) and identified as N-(triethoxysilyl)-aniline.

N-(triethoxysilyl)aniline was also prepared by the reaction of triethoxychlorosilane with aniline. The product has the following physical properties: B.P.= 79°/0.3 mm. $n_D^{24}=1.4811$. The infra-red spectrum of this compound has compared with those of the products obtained from the reactions of ortho, meta and para chloroaniline with magnesium and ethyl silicate. The spectra of all four compounds were identical showing that N-(triethoxysilyl)aniline was obtained in each case. In addition to N-(triethoxysilyl)aniline, higher boiling products were obtained from the reactions of the chloroanilines with ethyl silicate and magnesium. These compounds are believed to be as follows:

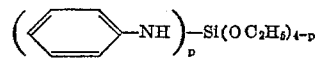

where $p=1$, 2 or 3.

EXAMPLE IV

*A. Preparation of 3-Chloro-N-Triethoxysilylaniline*

Into a 1-liter, 3-necked flask fitted with a mechanical stirrer, reflux condenser and addition funnel was placed 216 g. of a mixture of ethyl orthosilicate and triethoxychlorosilane containing 0.86 mole of triethoxychlorosilane dissolved in a mixture of triethylamine (111.3 g., 1.1 moles) petroleum ether (250 ml.). While being stirred, meta-chloroaniline (128 g. 1.0 mole) was added to the reaction flask over a period of 0.5 hour. The reaction mixture was stirred for an additional 1.0 hour. The reaction mixture was filtered and the solids washed with petroleum ether. The washings were combined with the filtrate and the low boiling materials evaporated under vacuum. Upon vacuum distillation of the residue 138 g. of crude product was collected. Upon redistillation of the crude product 3-chloro-N-(triethoxysilyl)-aniline was obtained having the properties: B.P.=93° C./0.2 mm. Hg $n_D^{23.5}=1.4934$.

*B. Reaction of 3-Chloro-N-Triethoxysilylaniline With Magnesium Metal and Ethyl Orthosilicate*

To a 1-liter, 3-necked flask fitted with a condenser, thermometer, mechanical stirrer and addition funnel were added magnesium turnings (14 g., 0.6 mole), and a mixture of ethyl orthosilicate (62 g., 0.3 mole) and tetrahydrofuran (29 ml.). To this was added 21 g. of 3-chloro-N-(triethoxysilyl)aniline. Upon heating to 80° C. the reaction was observed to initiate in about 5 minutes. An additional 64 g. (total 85 g. or 0.29 mole) of 3-chloro-N-(triethoxysilyl)aniline was added over a period of 10 minutes. After 3 hours of refluxing the pot temperature rose to 145° C. with the appearance of solids. Upon cooling 100 ml. of toluene was added and the reaction mixture filtered free of salts. The filtrate was evaporated under vacuum to remove low boiling material. The residue (66 g.) was then vacuum distilled. Two products were obtained, a liquid distillate and a solid residue. The solid residue was recrystallized from cyclohexane yielding crystals having a melting point of from 170° C. to 175° C. A total of 42 g. of the liquid distillate (B.P.=98° C., 0.15 mm. Hg; $n^{25}$ 1.4501) was obtained. An infra-red spectral analysis of the two products indicated that they have the structures as shown below:

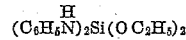

|  | Liquid | | Solid | |
|---|---|---|---|---|
|  | Calc. | Obtained | Calc. | Obtained |
| Neutral Equivalent | 417 | 406 | 209 | 215 |
| Percent silicon | 13.4 | 13.7 | 13.7 | 13.8 |
| Percent carbon | 51.8 | 49.3 | 58.6 | 58.0 |
| Percent hydrogen | 8.4 | 8.4 | 7.3 | 7.6 |

What is claimed is:

1. A process for the production of silicon-nitrogen compounds selected from the class consisting of (1) monomeric-silicon-nitrogen compounds of the formula

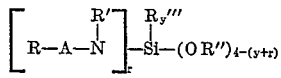

wherein A is a divalent aromatic hydrocarbon radical which is interconnected to the nitrogen through a carbon atom of the aromatic ring, R is a member of the class consisting of hydrogen, fluorine and monovalent organic radicals selected from the class consisting of alkyl groups, aryl groups, cycloalkyl groups, aralkyl groups, alkoxy groups, aryloxy groups, fluorine substituted alkyl, aryl, aralkyl, and cycloalkyl groups, and $-NR^1_2$ groups wherein $R^1$ is a member of the class consisting of alkyl, aryl, cycloalkyl, and aralkyl groups, R'' is a monovalent hydrocarbon radical, R''' is a monovalent hydrocarbon radical, $y$ is an integer having a value of from 0 to 3, $(r)$ is an integer of from 1 through 2, and R' is a member of the class consisting of hydrogen, alkyl groups, aryl groups, aralkyl groups, cycloalkyl groups and groups of the formula

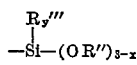

wherein R'', R''' and $y$ are as above defined and (2) polymeric silicon-nitrogen compounds of the formula

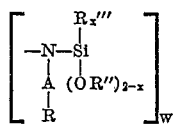

wherein R, R'', R''' are as above defined, $x$ is an integer of from 0 to 2 and $w$ is an integer of at least 3, which comprises reacting a halogen-substituted arylamine of the formula

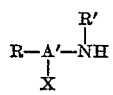

wherein R and R' have the above defined meanings, A' is an aromatic hydrocarbon radical and X is halogen selected from the class consisting of chlorine, bromine and iodine with magnesium and a silicon-ester selected from the class consisting of silicon-esters of the formulas:

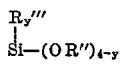

and

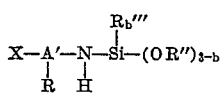

wherein R, R'', R''', A', X and $(y)$ have the above defined meanings and $(b)$ is an integer from 0 to 2.

2. A process as claimed in claim 1 wherein the reaction is conducted in the presence of tetrahydrofuran.

3. A process for the production of silicon-nitrogen compounds selected from the class consisting of organosilylamines of the formulas (1) 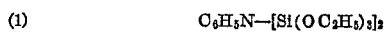 $C_6H_5N-[Si(OC_2H_5)_3]_2$ and (2) organosilylamines of the formula

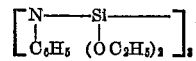

and (3) organosilylamines of the formula

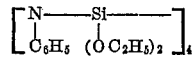

which comprises reacting 3-chloro-N-triethoxysilylaniline and ethyl orthosilicate with magnesium in the presence of tetrahydrofuran.

4. A process for the production of N-triethoxysilylaniline which comprises reacting chloro-aniline with magnesium and ethyl orthosilicate.

5. Silicon-nitrogen compounds selected from the class consisting of (1) organosilyl amines of the formula:

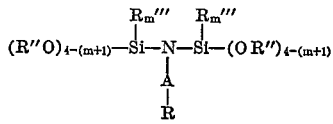

wherein A is a divalent aromatic hydrocarbon group which is interconnected to the nitrogen through a carbon atom of the aromatic ring, R is a member of the class consisting of fluorine, hydrogen and monovalent organic radicals selected from the class consisting of alkyl groups, aryl groups, cycloalkyl groups, aralkyl groups, alkoxy groups, aryloxy groups, fluorine substituted alkyl, aryl, aralkyl, and cycloalkyl groups and $-NR^1_2$ groups wherein $R^1$ is a member of the class consisting of alkyl, aryl, cycloalkyl, and aralkyl groups, R'' is a monovalent hydrocarbon radical R''' is a monovalent hydrocarbon radical, and $(m)$ is an integer of from 0 to 2, and (2) compounds of the formula

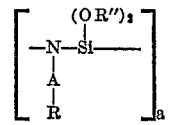

wherein R, R'' and A are as above defined and $(a)$ is an integer having a value of at least 3.

6. N,N-die(triethoxysilyl)aniline.

7. A composition of matter comprising a mixture of the silazanes having the formulas

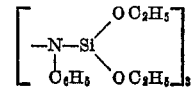

and

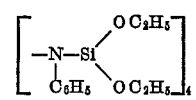

References Cited in the file of this patent

Larsson et al.: "Svensk Kemisk Tidskirft," volume 62, No. 6 (1950), pages 141–146.

UNITED STATES PATENT OFFICE
CERTIFICATE OF CORRECTION

Patent No. 3,054,818            September 18, 1962

Enrico J. Pepe et al.

It is hereby certified that error appears in the above numbered patent requiring correction and that the said Letters Patent should read as corrected below.

Column 3, lines 72 and 73, and column 4, lines 22 and 24, before "orthosilicate", each occurrence, insert -- ethyl --; column 9, line 26, for the subscript "3-x" read -- 3-y --.

Signed and sealed this 26th day of March 1963.

(SEAL)
Attest:

ESTON G. JOHNSON

Attesting Officer

DAVID L. LADD

Commissioner of Patents